(12) United States Patent
Korpi et al.

(10) Patent No.: US 6,904,041 B1
(45) Date of Patent: Jun. 7, 2005

(54) SYSTEM AND METHOD FOR COMMUNICATION DOMAINS AND SUBDOMAINS IN ZONES OF REAL TIME COMMUNICATION SYSTEMS

(75) Inventors: Markku Korpi, Starnberg (DE); Paul Mayer, Mountain View, CA (US); Robert Callaghan, Coral Spring, FL (US)

(73) Assignee: Siemens Communications, Inc., Boca Raton, FL (US)

(*) Notice: Subject to any disclaimer, the term of this patent is extended or adjusted under 35 U.S.C. 154(b) by 0 days.

(21) Appl. No.: 09/353,160

(22) Filed: Jul. 14, 1999

(51) Int. Cl.[7] .......................... H04L 12/28; H04L 12/56; H04L 12/66

(52) U.S. Cl. ....................... 370/401; 370/352; 370/389; 370/392; 370/410

(58) Field of Search .............................. 370/400–403, 370/352, 389, 392, 410

(56) References Cited

U.S. PATENT DOCUMENTS

| 6,128,304 | A  | * | 10/2000 | Gardell et al. | ............... | 370/401 |
| 6,259,691 | B1 | * | 7/2001  | Naudus         | ............... | 370/352 |
| 6,374,302 | B1 | * | 4/2002  | Galasso et al. | ............... | 709/238 |
| 6,445,695 | B1 | * | 9/2002  | Christie       | ............... | 370/352 |
| 6,496,477 | B1 | * | 12/2002 | Perkins et al. | ............... | 370/228 |
| 6,519,249 | B1 | * | 2/2003  | Bennefeld et al.| ...........   | 370/352 |

FOREIGN PATENT DOCUMENTS

| SE | WO 98/59470 | * 12/1998 |         |
| WO | WO 98/59467 | 12/1998   | ........... H04L/12/46 |

OTHER PUBLICATIONS

Copy of Search Report for PCT Appln. No. PCT/US00/16995; date search was completed: Nov. 15, 2000.

"Multimedia Conference Manager," Cisco Systems, Online, Mar. 4, 1999, pp. 1–42.

Liao, "Mobile Internet telephony: mobile extensions to H.323," *Proceedings IEEE Infocom. The Conference on Computer Communications*, New York, NY, Mar. 21, 1999, pp. 12–19.

(Continued)

*Primary Examiner*—Chi Pham
*Assistant Examiner*—Ronald Abelson

(57) ABSTRACT

A communication system, such as an H.323 system, in which a gatekeeper (108) may support a plurality of virtual private networks or virtual domains. Endpoints (102a, 102b, 106) are provided with communication domain identifiers (CDI) which identify the endpoints' domain. The CDI is provided during call setup and used during address resolution. In particular, H.323 endpoints according to the present invention are provided with a control layer which provides a communication domain identification (CDI) assigned to a user during call setup or other situations in which it is desirable to have domain-restricted functionality. In the call setup embodiment, the CDI may be used, during the address resolution phase of the H.323 direct signaling mode, to determine whether the call is to a user at another extension of the same company. In the direct signaling mode, the communication domain identification control layer accesses a local database to make this determination. Similarly, the CDI may be provided during call setup in gatekeeper routed signaling. In this case, a communication domain identification control layer provides the CDI to the gatekeeper. The gatekeeper then performs the address resolution using the CDI to determine whether the call is to a user of another extension of the same company. The CDI may be used to provide multiple virtual domains associated with a single gatekeeper, and also provide a virtual domain associated with multiple gatekeepers.

22 Claims, 6 Drawing Sheets

OTHER PUBLICATIONS

"A Primer on the H.323 Series Standard" Databeam, Online, May 15, 1998, pp. 1–17.

Johnson et al., "A Global Alphanumeric Naming Scheme for H.323," Request for Comments, Online, Jul. 12, 1999, pp. 1–2.

* cited by examiner

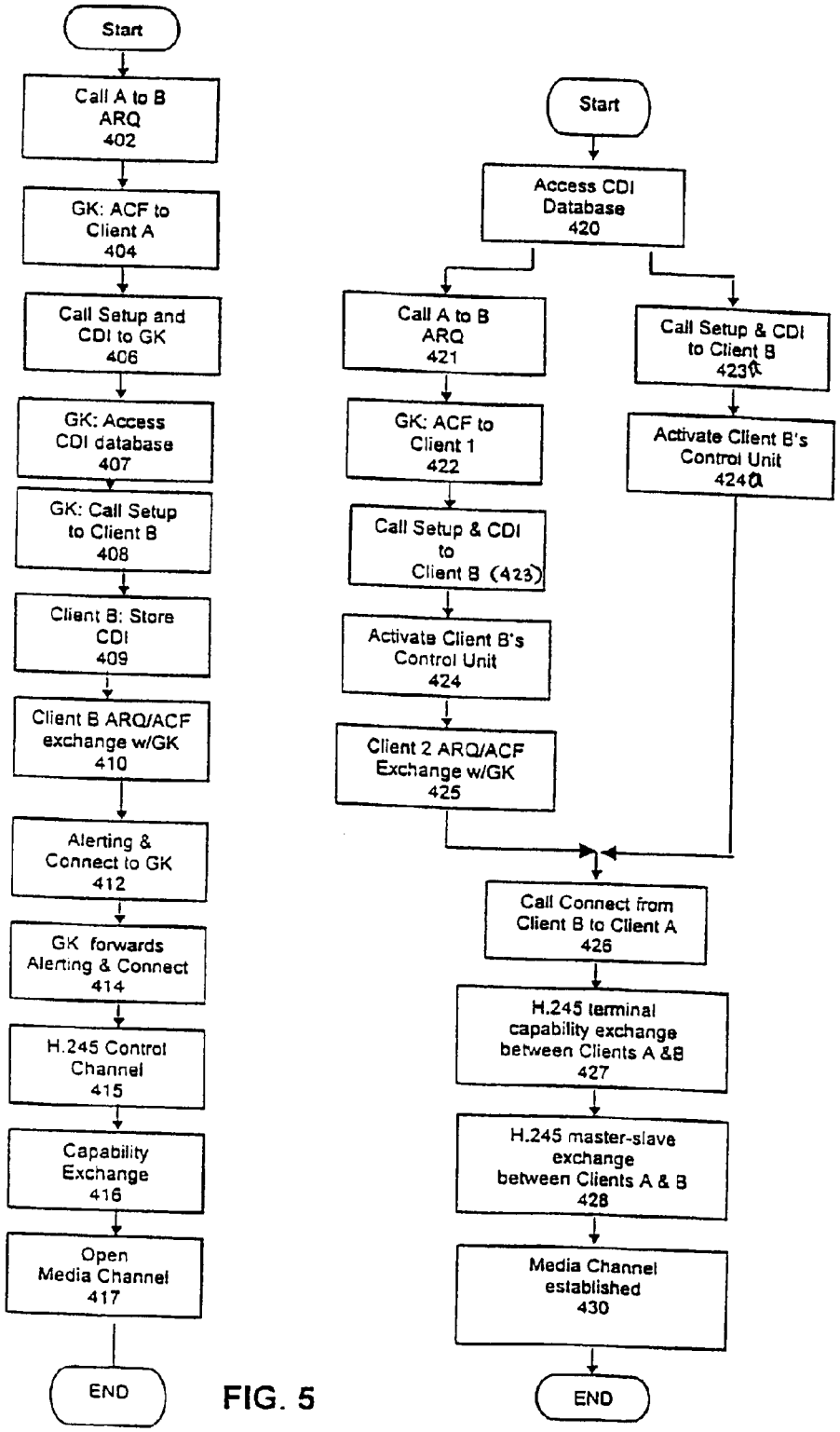

SYSTEM AND METHOD FOR COMMUNICATION DOMAINS AND SUBDOMAINS IN ZONES OF REAL TIME COMMUNICATION SYSTEMS

BACKGROUND OF THE INVENTION

1. Field of the Invention

The present invention relates to telecommunications systems and, particularly, to an improved H.323 system.

2. Description of the Related Art

The International Telecommunications Union (ITU) Recommendation H.323 describes a set of devices and protocols for multimedia communication over packet-switched networks. The four main components defined by the specification are clients (also referred to as terminals), multipoint control units (MCU), gateways, and gatekeepers. Clients and gateways are generally referred to as endpoints. The H.323 components are organized into administrative domains called "zones." Typically, each zone is managed by a gatekeeper.

Direct extension dialing for internal calls may be provided within each zone, i.e., by the gatekeeper. Thus, for example, users within a single company may need only to dial two or three digits to call other users within the company. However, it is frequently the case that users from more than one company may be served in a particular zone. In this case, each company would like to communicate within the company as if that company owned their network, and each company would like to take advantage of direct extension dialing, i.e., a "virtual private network." Unfortunately, under present H.323 systems, a gatekeeper can support only one numbering plan for a single zone. Consequently, there is no way for the individual companies to manage an individual extension-based dialing plan when a common gatekeeper is used to manage the single zone serving users from multiple companies; instead, internal calls must be placed using the full phone number. One alternative is to use a separate gatekeeper for each company, but this multiple gatekeeper alternative adds hardware and maintenance costs.

SUMMARY OF THE INVENTION

These disadvantages in the prior art are overcome in large part by a system and method according to the present invention. In particular, H.323 endpoints according to the present invention are provided with a control layer which provides a communication domain identification (CDI) assigned to a user during call setup or other situations in which it is desirable to have domain-restricted functionality. In the call setup embodiment, the CDI may be used during the address resolution phase of the H.323 direct signaling mode. In particular, the CDI is used to determine whether the call is to a user at another extension of the same company. In the direct signaling mode, the communication domain identification control layer accesses a local database to make this determination. Similarly, the CDI may be provided during call setup in gatekeeper routed signaling. In this case, a communication domain identification control layer provides the CDI to the gatekeeper. The gatekeeper then performs the address resolution using the CDI to determine whether the call is to a user of another extension of the same company. Of course, the called and calling parties may be in domains managed by different gatekeepers.

Once the CDI has been set up for a particular domain or subdomain, the CDI may be used for other forms of restriction checking, as well. For example, the CDI may be used for capability searching within the subdomain or subgroup. In such a case, particular supplemental services may be allowed only for some (or all) phones within a particular domain.

A better understanding of the invention is obtained when the following detailed description is considered in conjunction with the following drawings.

BRIEF DESCRIPTION OF THE DRAWINGS

FIG. 5 is a flowchart illustrating system operation according to an embodiment of the invention;

FIG. 7 is a flowchart illustrating system operation according to an embodiment of the invention.

DETAILED DESCRIPTION OF THE INVENTION

Figure 1:
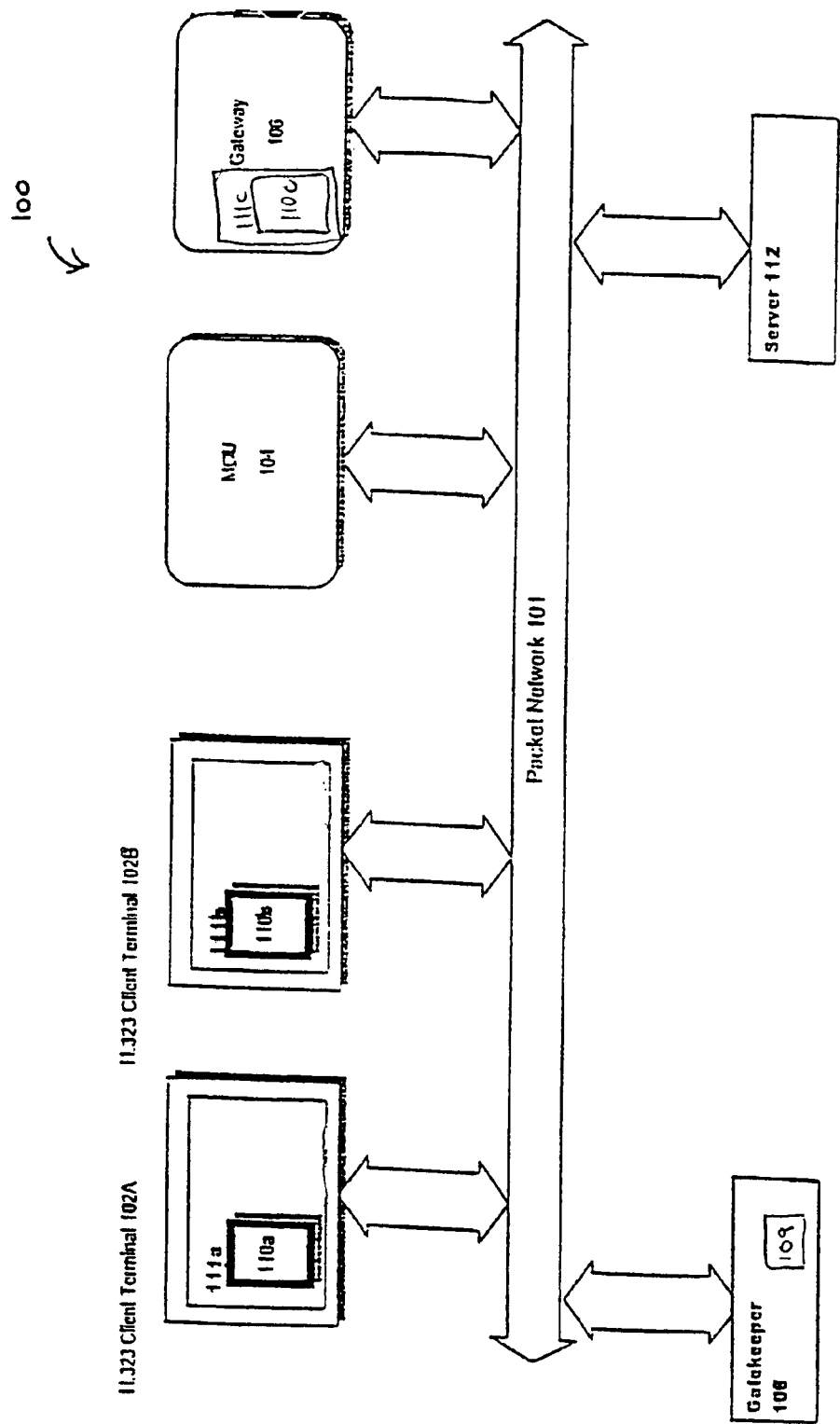
FIG. 1 is a diagram illustrating an H.323 system according to an embodiment of the invention.

Turning now to the drawings, and with particular attention to FIG. 1, a diagram illustrating an exemplary H.323 telecommunications system 100 according to an embodiment of the present invention is shown. It is noted that, while described specifically in the context of voice packets, the present invention encompasses the use of any multimedia information, such as video, data, voice, or any combinations thereof. It is further noted that an exemplary H.323 system which may be adapted for use in conjunction with the teachings of the present invention is the Siemens HiNet™ RC 3000 system available from Siemens. It is noted that the term "endpoint" includes client terminals and gateways.

In the below description, it should be recognized that the called and calling parties may be in domains managed by different gatekeepers, each of which utilizes the CDI of the present invention and thus provides for virtual private networks for multiples companies over a single physical network using, for example, H.323 protocols. In addition to being applicable to H.323 systems, the present invention may also be applicable to other Internet Protocol telephony architectures and protocols, such as the IETF Session Initiation Protocol (SIP), media gateway control protocols such as MGCP, or IETF Megaco, or the like. It is noted that in the below description, the term "gatekeeper" used for the H.323 embodiment is also intended to cover similar administrative functions such as functions that are performed by a "call agent" in SIP embodiments or a "controller" in MGCP embodiments.

In accordance with a specific embodiment, the telecommunications system 100 includes a local area network (LAN) or packet network 101. Coupled to the LAN 101 may be a variety of H.323 terminals 102a, 102b, a multi-point control unit (MCU) 104, an H.323 gateway 106, an H.323 gatekeeper 108, a LAN server 112 and a plurality of other devices such as personal computers (not shown). The H.323 terminals 102a, 102b are in compliance with the H.323 Recommendation. Thus, the H.323 terminals 102a, 102b support H.245 control signaling for negotiation of media channel usage, Q.931 (H.225.0) for call signaling and call setup, H.225.0 Registration, Admission, and Status (RAS), and RTP/RTCP for sequencing audio and video packets. The H.323 terminals 102a, 102b may further implement audio and video codecs, T.120 data conferencing protocols and MCU capabilities. Further details concerning the H.323 Recommendation may be obtained from the International Telecommunications Union; the H.323 Recommendation is hereby incorporated by reference in its entirety as if fully set forth herein. The H.323 terminals 102a, 102b may belong to the same company or to different companies.

Further, the H.323 endpoints 102a, 102b, 106 include H.323 control layers 111a, 111b, 111c including communication domain identification units (also referred to as "communication domain control layers") 110a, 110b, 110c according to the present invention. The communication domain identification units 110a, 110b, 110c function to determine whether a called number is an extension of the same company or an extension of an external party in direct signaling mode, or the CDI units simply provide the CDI to the gatekeeper 108 during a gatekeeper-routed mode. The gatekeeper 108 then resolves the address using the CDI and determines whether the called number is an internal extension. The gatekeeper 108 thus also is provided with a communication domain control unit 109 according to the present invention, as will be discussed in greater detail below. The communication domain identification units 10a, 110b, 110c and the communication domain control unit 109 thus permit more than one user to be assigned the same extension, with address resolution being performed additionally on the CDI. That is, the CDI allows creation of "virtual domains" with a single gatekeeper, or creation of "virtual domains" across multiple gatekeepers. It is noted that, while described with regard specifically to call setup procedures, the communication domain identifier may be used by the system for other domain-related restrictions, such as billing or availability of particular call or supplemental services. For example, the CDI may be used to restrict particular users to internal calls only, or to forbid access to other services. Thus, the figures are exemplary only.

Figure 2:
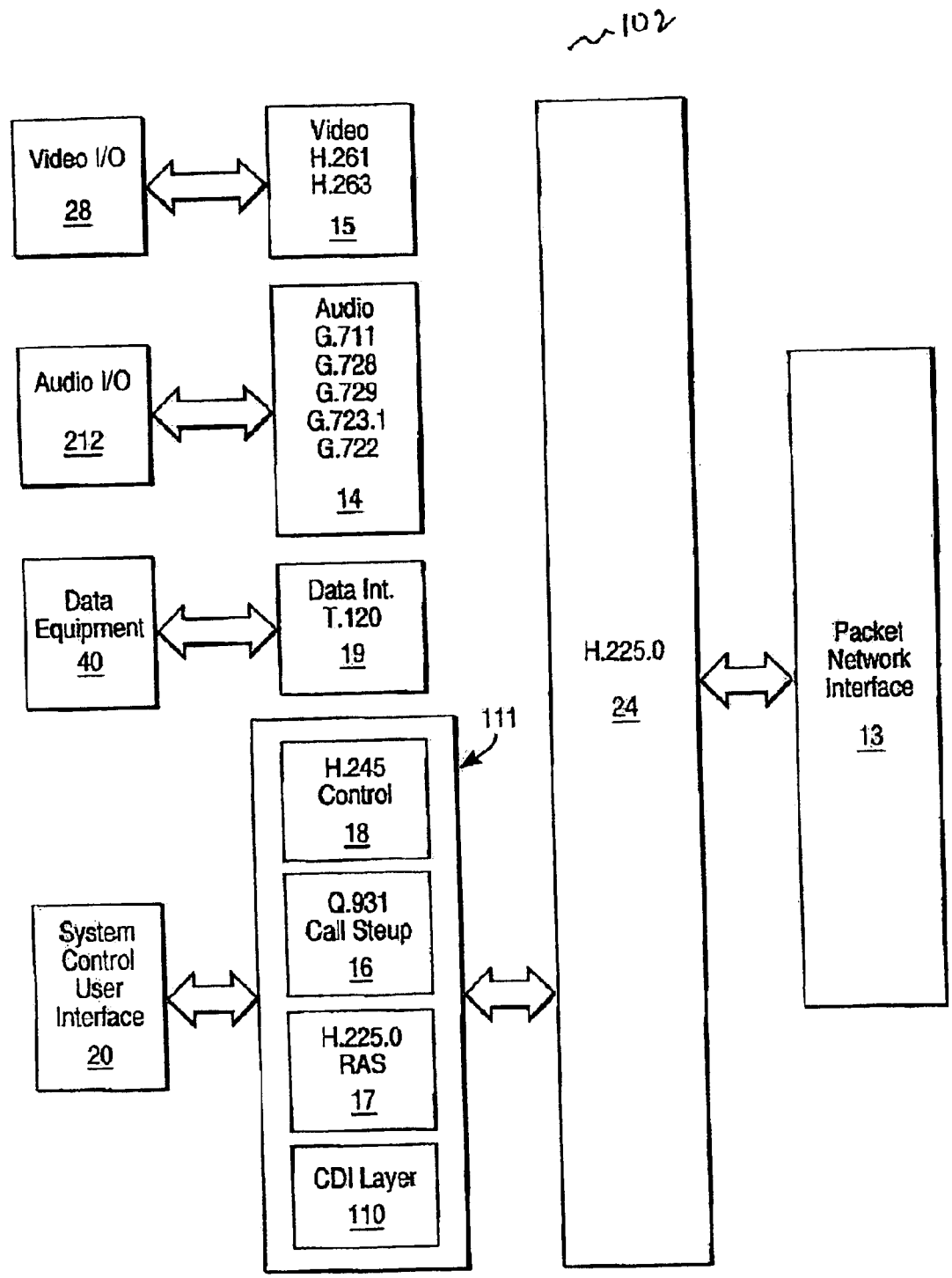
FIG. 2 illustrates an H.323 terminal with a communication domain identification layer according to an embodiment of the invention.

In accordance with a specific embodiment, FIG. 2 illustrates a logical diagram of an H.323 interface to the packet network or LAN 101 (FIG. 1). It is noted that, while illustrated in network layer format, typically, the communication domain control layer 110 is implemented in a state machine capable of implementing the H.323 protocol. The H.323 interface includes a network terminal/device 102 including a communication domain control layer 110 according to the present invention and a packet network interface 13 that is coupled to the network terminal 102. As will be discussed in greater detail below, the network terminal 102 utilizes the ITU-T H.323 Recommendation protocol. The network interface 13 couples the network terminal 102 to the LAN 101. The network can include packet-switched Transmission Control Protocol/Internet Protocol (TCP/IP) and Internet Packet Exchange (IPX) over Ethernet, Fast Ethernet and Token Ring networks.

The H.323 terminal 102 is coupled to a video input/output (I/O) interface 28, an audio I/O interface 212, a data equipment interface 40, and a system control user interface (SCUI) 20. The network terminal 102 further includes an H.225.0 layer 24, an audio coder/decoder (codec) 14 and may include, a video codec 15, and a T.120 data interface layer 19. The audio I/O interface or card 212, which may be part of the standard H.323 device, connects to the audio codec 14, such as a G.711 codec, for encoding and decoding audio signals. The audio codec 14 is coupled to the H.225.0 layer 24. It encodes audio signals for transmission and decodes the received signals. Although the G.711 codec is the mandatory audio codec for an H.323 terminal, other audio codecs, such as G.728, G.729, G.723.1, G.722, and MPEG1 audio may also be used for encoding and decoding speech. G.723.1 is a preferred codec because of its reasonably low bit rate, which enables preservation of link bandwidth, particularly in slower speed network connections.

The video I/O interface or card 28, which may be part of the standard H.323 device, connects to a video codec 15, such as an H.261 codec for encoding and decoding video signals. The video codec 15 encodes video signals for transmission and decodes the received signals. H.261 is the mandatory codec for H.323 terminals that support video, though other codecs such as H.263 may be supported.

The system control user interface (SCUI) 20 provides signaling and flow control for proper operation of the H.323 terminal 102. In particular, call signaling and control are handled by the SCUI 20. A communication domain control layer 110 according to the present invention forms part of an H.323 control layer 111 that is coupled to the SCUI 20. The communication domain control layer 110 functions to resolve whether a dialed extension is an internal number and also may provide it to a gatekeeper, as will be discussed in greater detail below.

The control layer 111 also includes a Q.931 layer 16, an H.225.0 RAS layer 17 and an H.245 layer 18. Thus, the SCUI 20 interfaces to the H.245 layer 18 which is the media control protocol that allows capability exchange, opening and closing of logical channels, mode preference requests, flow control messages, and other miscellaneous commands and indications. The SCUI 20 also interfaces to the Q.931 protocol 16, which defines the setup, teardown, and control of H.323 communication sessions. The SCUI 20 further interfaces to the H.225.0 Registration, Admission and Status (RAS) protocol that defines how H.323 entities can access H.323 gatekeepers to perform, among other things, address translation, thereby allowing H.323 endpoints to locate other H.323 endpoints via an H.323 gatekeeper. The H.225.0 layer 24, which is derived from the Q.931 layer 16 is the protocol for establishing a connection among two or more terminals and also formats the transmitted video, audio, data, signaling, and control streams into messages for communication via the network interface 13 (e.g., packet network 101). The H.225.0 layer 24 also retrieves the received video, audio, data, signaling and control streams from messages that have been input from the network interface, routes the signaling and control information to the control layer 111 and routes media streams to the appropriate audio, video and data interfaces.

Thus, an H.323 network may be configured to include several different devices. For example, the network may include a terminal for enabling a user connected to a LAN to communicate with another user on the LAN, a terminal for enabling a caller resident on the LAN to call a second party in the public switched network and/or a terminal for enabling an adapter to communicate through a wireless trunk, using a wireless telephone. The device may also implement supplementary services according to the H.450.X Recommendations.

Figure 3:
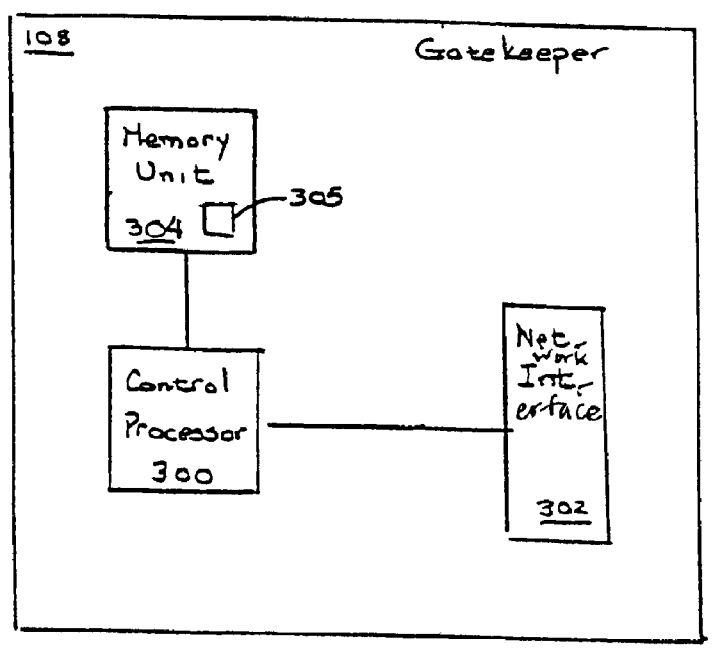
FIG. 3 illustrates a gatekeeper according to an embodiment of the invention.

An exemplary gatekeeper 108 according to an embodiment of the invention is shown in FIG. 3. As is known, the H.323 gatekeeper 108 performs address translation from IP or IPX addresses (as defined in the H.225.0 RAS Specification) as well as bandwidth management (also defined in the H.225.0 RAS Specification). The H.323 gatekeeper 108 is further used for call routing. The H.323 gatekeeper 108 thus includes a control processor 300, one or more memory units 304, and a network interface 302. The control processor 300 is programmed to implement CDI functionality 110 (FIG. 1).The memory unit 304 is used to store a database of CDI information 305. As will be described in greater detail below, when the H.323 gatekeeper 108 receives a call setup request in a gatekeeper-routed mode, it also receives a CDI. The gatekeeper 108 (and particularly, the control processor 300) accesses the CDI database 305 to determine whether the called party is local in performing address resolution. Moreover, the gatekeeper 108 may use the CDI for other domain-restricted functionality, such as domain-specific bandwidth allocation and the like.

Figure 4A:
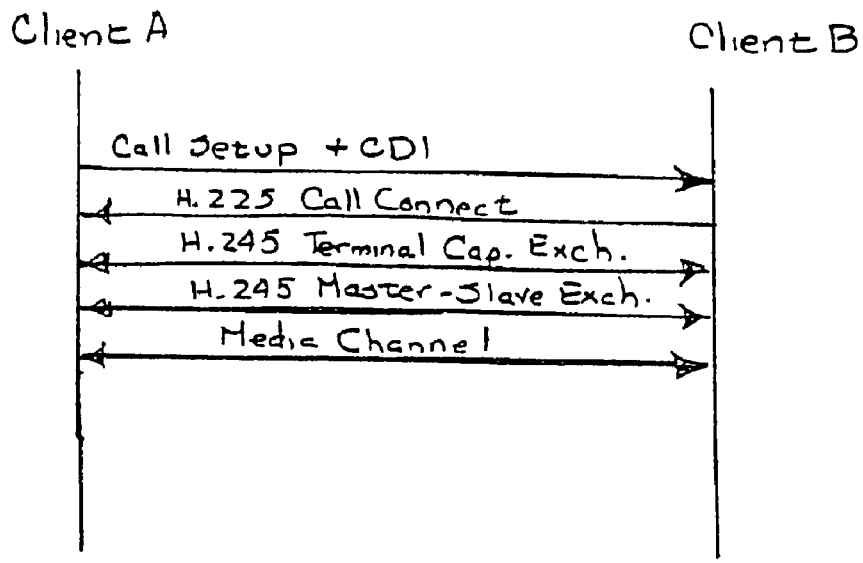
FIGS. 4A & 4B are diagrams illustrating signaling flow according to an embodiment of the invention.

FIG. 4A illustrates signaling flow according to an embodiment of the invention in which direct signaling between two endpoints is employed. It is noted that while the signal paths are shown as direct connections, typically, signaling is conducted via the LAN 101. In this example, the two endpoints are Client A and Client B that include communication domain identification layers according to the present invention. However, in other examples, the two endpoints may be a client and a gateway, or two gateways. The user of endpoint Client A initiates a call to the endpoint Client B, for example, by dialing an extension. In response, the endpoint Client A accesses a database (not shown) that identifies the called destination as having a same or different CDI and resolves the address of Client B and may also ascertain whether other domain-restricted functions are available. Then, the endpoint Client A sends an H.225.0 Setup message to the endpoint Client B. According to the present invention, the H.225.0 Setup message also includes the CDI, which may be stored by the endpoint Client B for future use. The endpoint Client B then receives the H.225.0 Setup message and the CDI. The endpoint Client B accesses its own database (not shown) to determine whether the caller is within the same company and/or whether other domain-related restrictions apply. The endpoint Client B then uses this information to direct an H.225.0 Call Connect message to the endpoint Client A. Next, having resolved each other's addresses, the client endpoints undertake an H.245 terminal capability exchange, a master-slave exchange, and finally, set up the media channel.

Figure 4B:
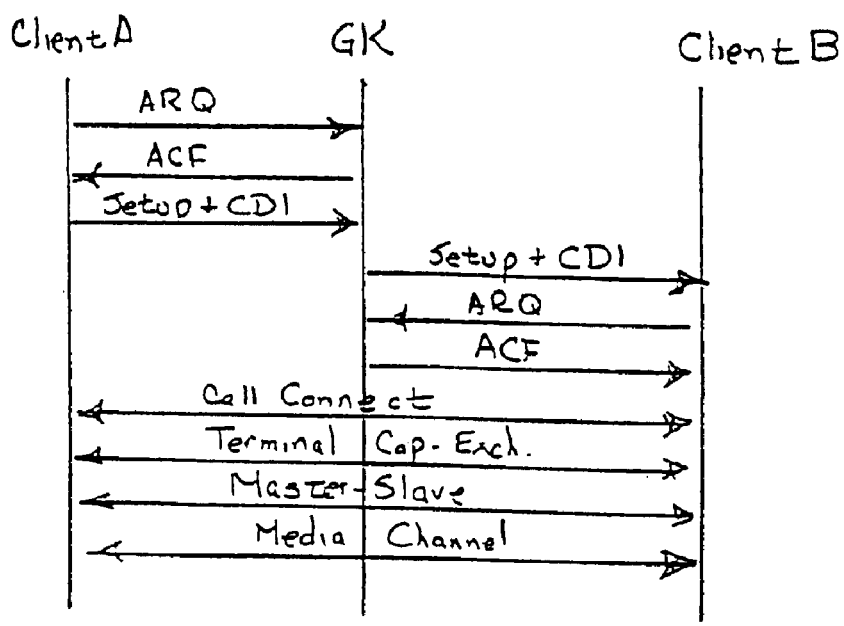

FIG. 4B illustrates a similar alternative embodiment, again with clients as the two endpoints discussed. In particular, in the embodiment of FIG. 4B, the gatekeeper is informed of the connection between the endpoints, but the gatekeeper itself is not used for the call connect signaling. If the endpoint Client A wishes to execute a call to the endpoint Client B, then the Client A sends an AdmissionRequest (ARQ) message to the gatekeeper GK requesting that a call be made using the direct signaling mode. The gatekeeper GK responds with an AdmissionConfirm (ACF) message. Then, the endpoint Client A sends an H.225.0 Setup message to the gatekeeper GK. The H.225.0 Setup message includes the CDI according to the present invention. The gatekeeper GK then accesses its database 305 (FIG. 3) advising it of whether the call is to an internal extension and whether other domain-related restrictions apply. The gatekeeper GK then forwards the H.225.0 Setup message with CDI to the Client B. The endpoint Client B and the gatekeeper GK then exchange the ARQ/ACF messages. Next, the Client A and Client B undertake a direct exchange (not via the GK) of H.245 Call Connect messages. The endpoints then directly proceed with an H.245 terminal capability exchange, an H.245 master-slave exchange and finally open the media channel.

The two embodiments using direct signaling to establish calls between endpoints, in these examples a Client A and a Client B, are illustrated in flowchart form in FIG. 5. In a step 420, the control layer 111a and particularly, the CDI layer 110a, determine whether a called party is within the same domain thereby performing a correct address resolution. For example, the CDI layer 110a accesses a database correlating the extension with another party on the network. The CDI layer 110a may further correlate the CDI with other domain-related functionality. In a step 421, the control layer 111a of Client A sends an ARQ message to the gatekeeper GK 1 requesting that a call to endpoint Client B be allowed using a direct call model. In a step 422, the gatekeeper GK 1 responds with an ACF message to the endpoint Client A, which is received by the control layer 111a. The ACF message includes a Call Signaling Transport Channel Address of the endpoint Client B. In a step 423, in response to the ACF message, the control layer 111a sends an H.225.0 Setup message directly to endpoint Client B including the Communication Domain Identification. In a step 424, the endpoint Client B receives the H.225.0 setup message and begins to process the received H.225.0 Setup message by storing the CDI. In response to the setup message, in a step 425, the endpoint Client B's control layer 111 conducts an ARQ/ACF exchange with the gatekeeper GK. Next, in a step 426, the endpoint Client B's control layer 111 sends an H.225.0 Connect message to the endpoint Client A's control layer to progress the call to a connect state. In a step 427, the endpoints Clients A and B exchange H.245 terminal capability messages. In a step 428, the endpoints Client A and Client B exchange H.245 master-slave determination messages and any other needed H.245 messages. In a step 430, both endpoints Client A and Client B establish a media channel between them.

In another embodiment, the exchange of ARQ/ACF messages may be omitted after step 420. That is, a direct call may be established between the control units 11a and 111b with no involvement of gatekeeper GK 1. In this scenario, steps 421, 422 and 425 are omitted. That is, after step 420, in a step 423a, the control layer 110a sends an H.225.0 message directly to the endpoint Client B, including the Communication Domain Identifier. In a step 424a, the endpoint Client 2 receives the H.225.0 Setup message and the CDI and determines whether the call is from an in-domain caller. This causes endpoint Client B to process the received H.225.0 Setup message. Next, steps 426, 427, 428 and 430 as described above are followed.

Figure 6:
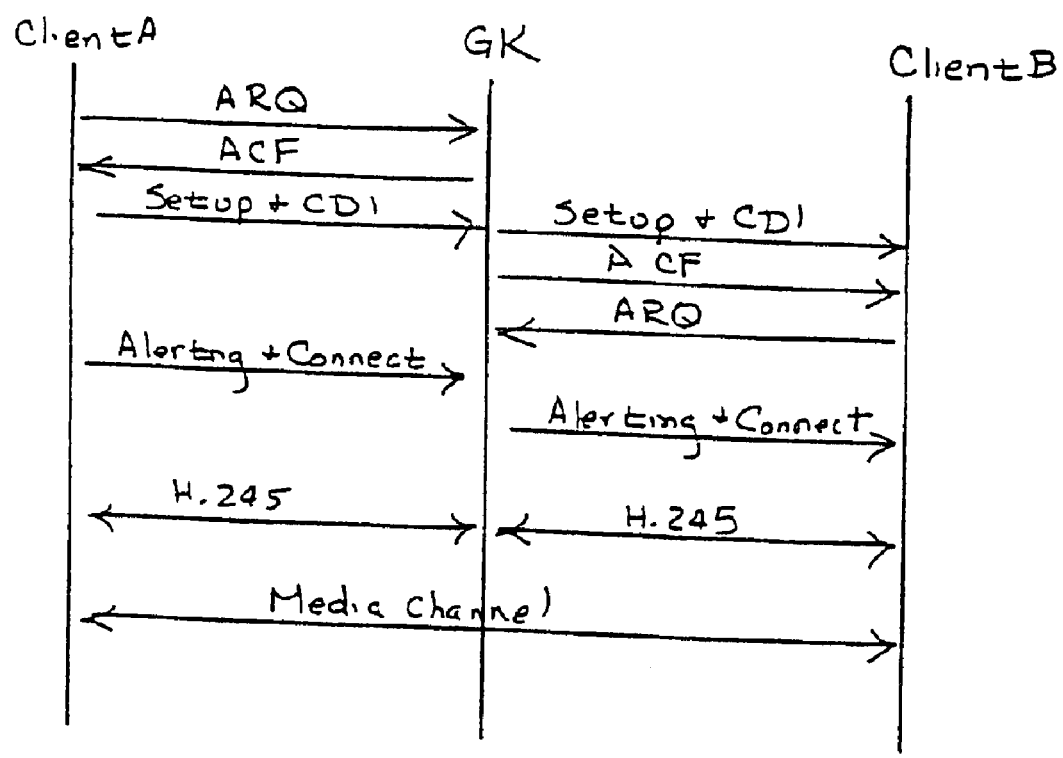
FIG. 6 is a diagram illustrating signaling flow according to another embodiment of the invention.

Signal flow for an alternative embodiment of the invention, employing gatekeeper-controlled call and control signaling is shown in FIG. 6. In particular, if the endpoint Client A wishes to set up a call to the endpoint Client B, the endpoint Client A sends an ARQ message to the gatekeeper GK. The gatekeeper GK responds with an ACF message. Next, the Client A sends an H.225 Setup message to the gatekeeper GK including the Communication Domain Identifier (CDI). The gatekeeper GK accesses its database for the CDI and forwards this message to the Client B. The Client B responds with an ARQ to the gatekeeper GK. The gatekeeper GK replies with an ACF to the Client B. Next, the endpoint Client A responds with an H.225 Alerting and Connect message. The gatekeeper GK forwards the Alerting and Connect message to the endpoint Client B. The Alerting and Connect message is used to set up the H.245 control channel, in this case, between the gatekeeper GK and the endpoints. Finally, the media channel is established, directly between the endpoints Client A and Client B.

Operation of this embodiment of the invention is illustrated more clearly with reference to the flowchart of FIG. 7. In particular, in a step 402, the endpoint Client A wants to establish a call to another endpoint, Client B. The endpoint Client A and, particularly, the control unit 110*a*, sends an ARQ message (AdmissionRequest) to the gatekeeper GK. Assuming the gatekeeper GK is functioning, the gatekeeper GK responds with an ACF (AdmissionConfirm) message to Client A, in a step 404, which is received by the control unit 110*a*. The ACF message includes a Call Signaling Transport Channel Address of the gatekeeper GK. In a step 406, in response to the ACF message, the control unit 110*a* sends an H.225.0 Set-up message to the gatekeeper GK, including a Globally Unique Call Identifier to identify the call and the Communication Domain Identifier (CDI) of the endpoint Client A. It is noted that the CDI can be assigned either to the endpoint terminal itself or to the individual user, so that more than one user may use a single H.323 terminal. In a step 407, the gatekeeper GK, and in particular the control processor 300 accesses its CDI database 305 to determine whether the called party is within the same administrative domain and to resolve the address of the called party. Further, the CDI may be used for other domain-restricted functionality. In preferred embodiments, in order to protect the network of false use of CDIs, only the administrator is able to associate and change the CDI for the user.

In a step 408, having determined the address of the endpoint Client B, the gatekeeper GK relays the H.225.0 Setup message including the CDI to the endpoint Client B and, in particular, its control unit 110*b*. In a step 409, the endpoint Client B may store the CDI of the calling party endpoint Client A. In a step 410, the endpoint Client B's control unit 110*b* conducts an ARQ/ACF exchange with the gatekeeper GK. In a step 412, the endpoint Client B's control unit 110*c* sends H.225.0 Alerting and Connect messages to the gatekeeper GK as the call progresses to the connect state. The gatekeeper GK, in turn provides the Alerting and Connect messages to the endpoint Client A's control unit 110*a* in a step 414. The Alerting or Connect message includes the Gatekeeper H.245 Control Channel Transport Address, which is used, in a step 415, to establish the H.245 control channel. Next, an H.245 capability exchange is undertaken, in a step 416. In a step 417 the media channel is opened between endpoint Client A and Client B.

What is claimed is:

1. An H.323 endpoint, comprising:
   an H.323 controller configured to handle call and control signaling during a media communication with another H.323 endpoint via a gatekeeper or directly with another H.323 endpoint;
   wherein said H.323 controller provides a communication domain identifier for address resolution during a media communication, said communication domain identifier permitting use of multiple virtual domains created with a single gatekeeper based on said communication domain identifier or permitting use of virtual domains created with multiple gatekeepers based on said communication domain identifier;
   wherein said H.323 controller is configured to use said CDI to determine a domain of a called party during an address resolution phase in a gatekeeper routed signaling mode; wherein said H.323 controller is configured to use said CDI to determine a domain of one or more parties during execution of one or more domain-restricted functions.

2. An H.323 endpoint, comprising:
   an H.323 controller configured to handle call and control signaling during a media communication with another H.323 endpoint via a gatekeeper or directly with another H.323 endpoint;
   wherein said H.323 controller provides a communication domain identifier for address resolution during a media communication, said communication domain identifier permitting use of multiple virtual domains created with a single gatekeeper based on said communication domain identifier or permitting use of virtual domains created with multiple gatekeepers based on said communication domain identifier;
   wherein said H.323 controller provides said gatekeeper with said CDI during an address resolution phase in a gatekeeper routed signaling mode; wherein said H.323 controller is configured to use said CDI to determine a domain of one or more parties during execution of one or more domain-restricted functions.

3. An H.323 endpoint, comprising:
   an H.323 controller configured to handle call and control signaling during a media communication with another H.323 endpoint via a gatekeeper or directly with another H.323 endpoint;
   wherein said H.323 controller provides a communication domain identifier for address resolution during a media communication, said communication domain identifier permitting use of multiple virtual domains created with a single gatekeeper based on said communication domain Identifier or permitting use of virtual domains created with multiple gatekeepers based on said communication domain identifier;
   wherein said H.323 controller is configured to use said CDI to determine a domain of one or more parties during execution of one or more domain-restricted functions.

4. An H.323 endpoint, in accordance with claim 3, wherein said H.323 endpoint comprises a client terminal or gateway.

5. A communication endpoint for use in a network comprising:
   a controller configured to handle call signaling during a media communication with another endpoint via a gatekeeper or directly with another endpoint;
   wherein said controller is configured to maintain a database for identifying multiple virtual domains defined by a single gatekeeper based on a CDI or a virtual domain defined by multiple gatekeepers based on a CDI.

6. A communications endpoint, for use in a network comprising:
   a controller configured to handle call signaling during a media communication with another endpoint via a gatekeeper or directly with another endpoint;
   wherein said controller is configured to maintain a database for identifying multiple virtual domains created with a single gatekeeper based on a CDI or a virtual domain created with multiple gatekeepers based on a CDI;
   wherein said controller is configured to provide an identification of said virtual domain to said gatekeeper during an address resolution phase.

7. A communication endpoint for use in a network comprising:
- a controller configured to handle call signaling during a media communication with another endpoint via a gatekeeper or directly with another endpoint;
- wherein said controller is configured to maintain a database for identifying virtual domains defined by a single gatekeeper based on a CDI or a virtual domain defined by multiple gatekeepers based on a CDI,
- wherein said controller is configured to access said database for a virtual domain identifier in a direct signaling mode.

8. A communications endpoint for use in a network comprising:
- a controller configured to handle call signaling during a media communication with another endpoint via a gatekeeper or directly with another endpoint;
- wherein said controller is configured to maintain a database for identifying multiple virtual domains created with a single gatekeeper based on a CDI or a virtual domain created with multiple gatekeepers based on a CDI;
- wherein said controller is configured to provide an identification of said virtual domain during execution of one or more domain-restricted functions.

9. A communications endpoint, in accordance with claim 6, wherein said communications endpoint comprises a client terminal or a gateway.

10. A telecommunications system, comprising;
- a packet-switched network;
- a plurality of endpoints coupled to said packet switched network;
- a gatekeeper coupled to said packet switched network;
- wherein predetermined numbers of said plurality of endpoints include virtual domains defined by a same gatekeeper based on a CDI or virtual domains defined by multiple gatekeepers based on a CDI;
- wherein said endpoints include communication domain identification controllers for resolving associated virtual domains during a call setup procedure.

11. A telecommunications system according to claim 10, wherein said communication domain identification controllers include a database of communication domain identifiers (CDI).

12. A telecommunications system, comprising:
- a packet-switched network;
- a plurality of endpoints coupled to said packet switched network;
- a gatekeeper coupled to said packet switched network;
- wherein predetermined numbers of said plurality of endpoints define virtual domains created with a same gatekeeper based on a CDI or virtual domains created with multiple gatekeepers based on a CDI;
- wherein said endpoints include communication domain identification controllers for resolving associated virtual domains during a call setup procedure;
- wherein said communication domain identification controllers include a database of communication domain identifiers (CDI);
- wherein said communication domain identification controllers are configured to provide said CDIs to said gatekeeper during a call setup operation.

13. A telecommunication system according to claim 11, wherein said communication domain identification controllers are configured to use said CDIs to resolve an address of a called party during a call setup operation.

14. A telecommunications system, comprising:
- a packet-switched network;
- a plurality of endpoints coupled to said packet switched network;
- a gatekeeper coupled to said packet switched network;
- wherein predetermined numbers of said plurality of endpoints define virtual domains created with a same gatekeeper based on a CDI or virtual domains created with multiple gatekeepers based on a CDI;
- wherein said endpoints include communication domain identification controllers for resolving associated virtual domains during execution of one or more domain-restricted functions.

15. A method for operating a telecommunication system having at least one gatekeeper and a plurality of endpoints, comprising:
- storing a database of communication domain identifiers (CDI) in said plurality of endpoints, said CDI identifying an association of said endpoints with virtual domains defined by one of said at least one gatekeeper based on a CDI; and
- accessing said database to determine a CDI of a called party when a call is made.

16. A method according to claim 15, including providing said CDI to said gatekeeper so said gatekeeper can resolve an address of a called party.

17. A method according to claim 16, said storing including storing a CDI of a plurality of users with a single endpoint.

18. A method according to claim 15, further comprising executing one or more domain-restricted functions based on said gatekeeper or with a virtual domain associated with multiple gatekeepers.

19. A method according to claim 15, wherein said CDI identifies an association of said endpoints with a virtual domain associated with multiple of said at least one gatekeepers.

20. A telecommunications method in a system including a plurality of endpoints and at least one gatekeeper, the method comprising:
- storing a database of communication domain identifiers (CDI) in said plurality of endpoints, said CDI identifying an association of said endpoints with virtual domains created with said at least one gatekeeper based on a CDI; and
- accessing said database to determine a CDI of a called party when a call is made to determine if said called party is associated with a local extension.

21. A telecommunications endpoint, comprising:
- a controller configured to handle call and control signaling during a media communication with another endpoint via a gatekeeper or directly with another endpoint;
- wherein said controller provides a communication domain identifier during a media communication, said communication domain identifier permitting use of multiple virtual domains created with a single gatekeeper based on said communication domain identifier or permitting use of virtual domains associated with multiple gatekeepers based on said communication domain identifier;
- wherein said controller is configured to use said communication domain identifier to determine a domain of one or more parties during execution of one or more domain-restricted functions.

22. A communications endpoint for use in a network, comprising:

a controller configured to handle call signaling during a media communication with another endpoint via a gatekeeper or directly with another endpoint;

wherein said controller is configured to maintain a database for identifying multiple virtual domains created with a single gatekeeper based on a CDI or a virtual domain created with multiple gatekeepers based on a CDI;

wherein said controller is configured to provide an identification of said virtual domain for execution of one or more domain-restricted functions.

* * * * *